May 15, 1962
A. M. DOULGHERIDIS
3,034,803
SHOCK ABSORBERS AND SUSPENSIONS OPERATED
BY LIQUID AND/OR GASEOUS FLUID
Filed Dec. 3, 1958
2 Sheets-Sheet 1
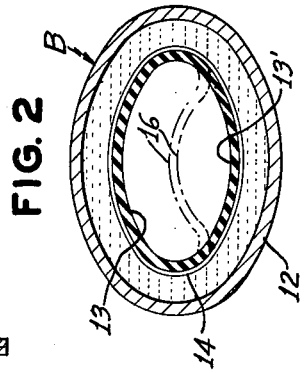
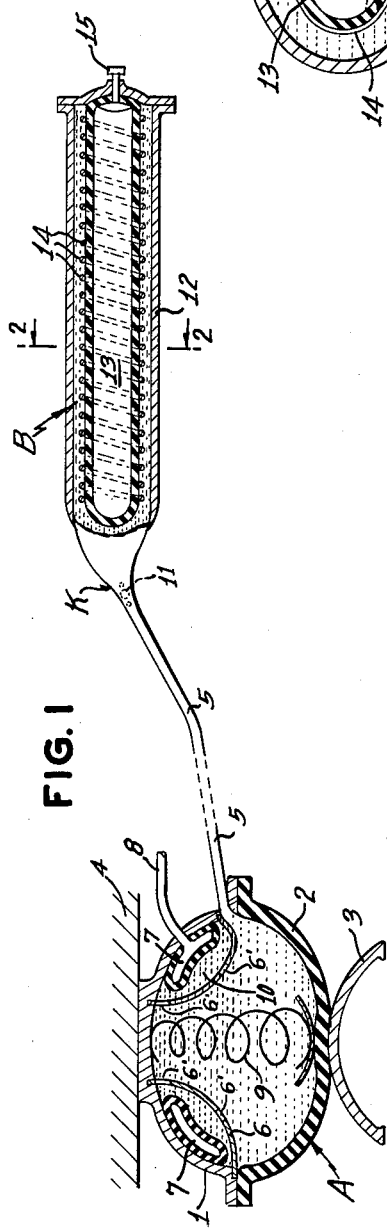
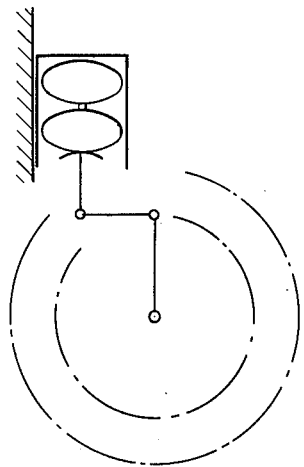
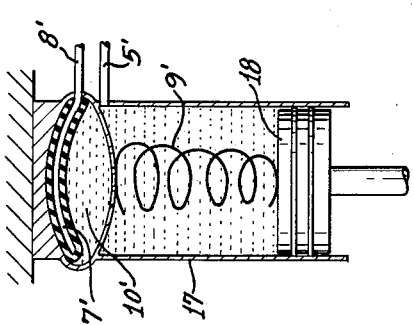
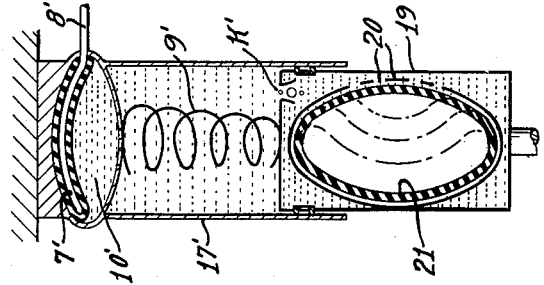
*INVENTOR.*
ALCIBIADES M. DOULGHERIDIS
BY
ATTORNEYS May 15, 1962

A. M. DOULGHERIDIS 3,034,803

SHOCK ABSORBERS AND SUSPENSIONS OPERATED
BY LIQUID AND/OR GASEOUS FLUID

Filed Dec. 3, 1958

INVENTOR.
ALCIBIADES M. DOULGHERIDIS

BY
Pennie, Edmonds, Morton, Barrows & Taylor

ATTORNEYS

United States Patent Office 3,034,803
Patented May 15, 1962

3,034,803
SHOCK ABSORBERS AND SUSPENSIONS OPERATED BY LIQUID AND/OR GASEOUS FLUID
Alcibiades Michel Doulgheridis, 39 Solomou St., Athens, Greece
Filed Dec. 3, 1958, Ser. No. 778,004
6 Claims. (Cl. 280—124)

My invention relates to improvements in hydropneumatic elastic systems particularly useful in connection with shock absorbers, suspension devices and the like for vehicles.

The primary object of my invention is to provide a hydropneumatic elastic system adapted to counteract the vibrations and oscillations of a vehicle during its travel along the highway or road.

A further object of my invention is to provide a hydropneumatic system which operates automatically to oppose the swinging or swaying of a vehicle on turns or curves.

In accordance with the features of my invention the improved hydropneumatic system comprises a first liquid-filled chamber having a deformable compressible wall subject to external pressure, a second liquid-filled chamber having solid indeformable walls, a liquid-flow conduit or passage by which the interiors of said chambers communicate with each other, a gas-filled chamber within the solid indeformable chamber, surrounded by the liquid therein and having flexible walls easily yieldable inwardly in response to external pressure, this gas filled chamber being incapable of dilation beyond a predetermined limit, the system being such that when external pressure is applied to the deformable wall of the first chamber, liquid escapes through the said conduit or passage into the second chamber and compresses the gas in the gas-filled chamber thereby decreasing the volume of the gas-filled chamber, liquid being caused to flow in the reverse direction by the elastic reaction of the compressed gas in the gas-filled chamber when the external pressure on the deformable compressible wall is relaxed, and a flow restricting valve interposed in the said conduit, permitting free flow of the liquid from the first compressible chamber into the second chamber, but retarding the flow of liquid in the reverse direction. An additional new and improved flow reducing device is adapted to the system, which permits the liquid to flow freely from one chamber to the other during the vibrations and the small oscillations of the vehicle frame, which take place normally in the middle zone of the vertical displacements of the frame, but restricts this flow on both sides of this zone where the great oscillations take place, thereby increasing the resistance opposed to them, and reducing or eliminating the abrupt bumps and jolts of the frame, so that the vehicle rides smoothly.

Another feature characteristic of my invention is a new equilibrator device, which retains, or brings back to the vertical the vehicle as soon as it inclines laterally for whatever reason; the same happens when the vehicle is tilted violently by centrifugal force, for example in a rapid and abrupt turning; in this case the equilibrator tilts the vehicle beyond the vertical towards the opposite side for greater security.

Furthermore another characteristic feature of my invention is that in a fluid-filled chamber supporting external compression, a special coiled or spirally wound spring is placed, mounted in parallel with the elastic resistance opposed by the compressed fluid, thereby reducing the pressure applied to the flexible walls of the chamber, while by its parallel mounting excluding any danger of resonance, which is frequent with springs mounted in series.

Still another special feature of my invention is that a flexible compressible wall of a chamber filled with a fluid under pressure, is compressed externally in such a manner, that pinching and wrinkles are excluded, since the convexity of this wall is progressively and regularly changed into a concavity having precisely the same form, although oppositely. Thus rapid deterioration of the walls is avoided.

Detailed explanation of the above features follows hereinafter.

Some embodiments of the invention are illustrated in the accompanying somewhat diagrammatic drawings to which reference is now made.

FIG. 1 is a vertical section of a vehicle suspension device, composed of a first chamber having compressible deformable walls and including the equilibrator, and of a second solid indeformable chamber containing a compressible chamber filled with compressed air.

FIG. 2 is a sectional view taken on the line 2—2 of FIG. 1 of the second solid chamber of FIG. 1 containing the air chamber filled with compressed air.

FIG. 3 shows in vertical section a first compressible chamber, in which compression is effected by a piston sliding in a cylinder, and which is provided with an equilibrator.

FIG. 4 is a view similar to that of FIG. 3 in which a hollow piston is provided containing an air chamber analogous to the air chamber of the second solid chamber of FIG. 1.

FIG. 5 shows diagrammatically a pair of compressible deformable chambers which communicate with each other, the chambers being arranged horizontally and compressed indirectly by means of a bell crank lever connected with the vehicle axle.

Figure 6:
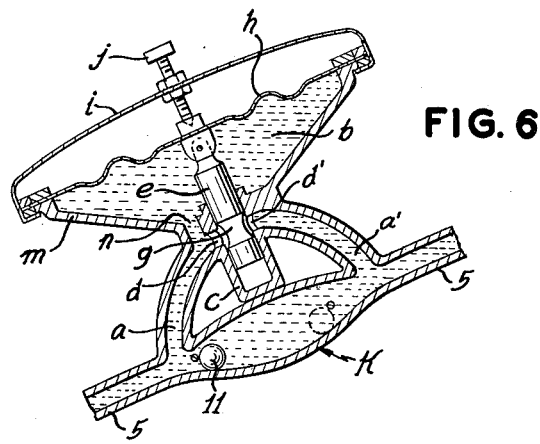
FIG. 6 is a sectional view through a device for reducing great oscillations, while permitting normal vibrations and the small oscillations of the vehicle frame.

In the FIG. 1 which shows a vehicle shock absorber or suspension, the first compressible chamber A, interposed between the vehicle frame 4 and the member 3 carried by the axle, is filled with a suitable liquid. The part or wall 2 of the chamber is of flexible deformable material, suitably very reinforced, whereas the part 1 is of metal. This chamber A communicates by a conduit 5 with a second closed tube shaped metal chamber B having walls 12, filled also with the same liquid and containing a smaller correspondingly shaped bag 13 filled with compressed air through a valve 15 and having flexible easily yieldable walls. The bag 13 is prevented from dilation beyond a predetermined limit by a helically wound wire 14, wound around the bag 13, which assures the free circulation of the liquid between the walls 12 of the chamber B and those of the inclosed air chamber or bag 13. In the conduit 5 is a restricting valve K which allows free flow of liquid from the compressible chamber A to the solid chamber B, but reduces the flow in the reverse direction in the manner of a dash-pot. The above very simple and undisturbable flow restricting valve consists of a body, preferably a metallic inalterable ball 11 of suitable weight and diameter, which moves freely in a conoidal conduit inclined with its smaller end toward the compressible first chamber A.

The conoidal conduit is provided with means as shown for retaining the ball at a suitable predetermined distance from its ends in order to prevent their closure.

In the compressible chamber A a coiled or spirally wound spring 9 is mounted in parallel with the elastic resistance opposed by the compressed fluid. This parallel mounting provides a construction in which the compressed fluid and spring 9 are both obliged to work and cooperate with each other closely and in synchronism to the same end. The spring 9 on the other hand elastically supports a part of the load of the vehicle, thereby lightening the pressure exerted on the liquid and consequently on the flexible deformable walls of the compression chamber, thus avoiding the possibility of their breaking. The liquid on the other hand, being deprived of periodic oscillations, opposes this natural inertia to and hinders or stops the tedious innate periodic oscillations of the spring, thus excluding any danger of resonance between the spring and the frame of the vehicle, which is frequent with springs mounted in series, i.e., the one arranged in parallel with the other corrects each other's responsive deficiencies.

The chamber A also contains an equilibrator 7 comprising an annular inflatable and deflatable chamber. This device is associated with other equipment of a system shown in FIG. 7 which is constructed and works as follows:

The system is composed of a hydropneumatic chamber Z (FIG. 7), which is like the tube shaped chamber B, and constitutes the central pressure accumulator, which furnishes the necessary liquid under pressure to the equilibrators of the vehicle. 24 is a depot or chamber containing liquid for example oil, which is sent under the necessary pressure into the pressure accumulator Z by the pump 26. As soon as the pressure in the chamber Z goes down to a minimum determinated point, the pump begins automatically to work, and is stopped when the pressure maximum is reached. This working is regulated by the usually employed means; indicatively a manometer 25 is shown, which by electric contacts of its needle acts automatically in a manner that the pressure accumulator Z is found always filled with liquid under elastic pressure between predetermined maximum and minimum limits. Thus by simply opening a cock the oil under pressure is immediately canalized from the accumulator to the desired mechanism. A security or pressure relief valve 27 is provided in the pipe connection to the chamber Z, which permits oil to return into the depot 24 in the case of the pressure in the chamber Z going beyond the maximum limit. M is a general regulator which intervenes to retain and bring back to the vertical the vehicle as soon as it begins to tip or lean laterally; N is the regulator which intervenes to retain and to bring back the vehicle to the vertical, even to force the body of the vehicle towards or beyond the opposite side, for more safety, when violently forced or tipped laterally by centrifugal force; and 28 is a bifurcated conduit coming from the accumulator Z, each branch 28', 28' of which communicates with a conduit 8 of the two equilibrators 7 of the respective suspensions A at the same side of the vehicle.

The equilibrator, properly so called, consists of a ring-shaped closed chamber 7 (FIG. 1) placed into the compressible first chamber A, in its upper lateral part and has supple flexible walls, the external surface of which is set upon the internal surface of the rigid part 1 of the compressible chamber A, while the remaining of them are free, so permitting the filling of the chamber by a fluid, as well as its evacuation and its collapse. Internally to this chamber 7 is a conoidal solid sleeve 6, which being fixed to part 1 of the chamber A separates, together with the internal surface of the solid part of the chamber A, a ring-shaped space 10 in which is spaciously enclosed the ring-shaped chamber 7. This space communicates with the interior of the chamber A through openings 6' in its upper end and some others in the sleeve. In this manner the chamber 7 has, when filled, a predeterminated maximum capacity, since it cannot be dilated beyond that permitted by the ring-shaped space 10. 8 is the conduit through which the equilibrator chamber 7 communicates through a branch conduit 28' (FIG. 7) with the conduit 28 of the pressure accumulator Z. Ordinarily the equilibrator 7 is empty and its walls are collapsed under the pressure of the liquid in the chamber A. But when the vehicle is inclined laterally, fluid under pressure comes from the chamber Z by intervention of the regulators N or M and inflates the equilibrator chamber, thus the whole content of the chamber A is increased, thereby raising the corresponding side of the vehicle body.

Figure 7:
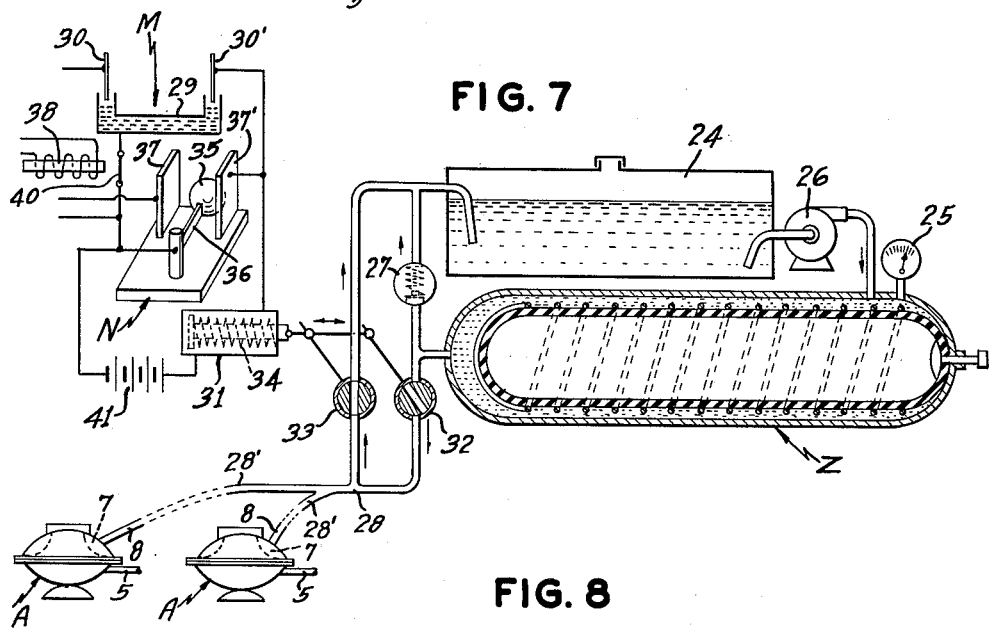
FIG. 7 is a diagrammatic view partially in section showing the whole mechanism of the equilibrator device working with liquid under pressure.

The regulator M, FIG. 7, comprises a tube 29 made of iron or other suitable material the ends of which form two upright branches, and which is filled with mercury to a certain height of its branches. Two insulated electrodes 30, 30' are fixed, one in each branch, a little distant of the surface of the mercury. The tube 29 is fixed in a direction parallel to the transverse axis of the vehicle and its middle part is sufficiently restricted to hinder more or less the very easy oscillating of the mercury. When the vehicle is inclined to one side, the mercury mounts in the corresponding branch and comes in contact with the electrode 30' for example, whereby an electric current is established through a normally-closed switch 40 and a battery 41 and activates the electromagnet 31, which in its turn closes the cock 33 and after opens the cock 32; then the liquid from the chamber Z flows under pressure through the conduits 28', 28' into the two equilibrators 7, 7 of the same side of the vehicle, which being so inflated raise the corresponding side of the frame and retains and brings back the vehicle body to the vertical. When the vehicle body is righted the contact between the mercury and the electrode 30' is interrupted the cock 32 is closed and after the cock 33 is opened by the action of the spring 34, whereupon the liquid introduced in the equilibrators 7, 7 is forced back into the depot 24 through the cock 33 by the pressure of the liquid contained in the chamber A.

The regulator N (FIG. 7) includes a metallic body 35 fixed on the end of a flat spring 36 which is fixed by its other end horizontally and in a parallel direction to the longitudinal axis of the vehicle, and two electrodes 37, 37' a little distant to the right and to the left of said body. When centrifugal force pushes the vehicle for example to the right, then the body 35 touches the electrode 37', the electromagnet 31 is activated and the liquid under pressure comes from the chamber Z into the two equilibrators of the right side, so that the frame is raised on that side; but when the vehicle reaches the vertical, the electric current is not interrupted since the body 35 pushed by the centrifugal force continues to touch the electrode 37', thereby the vehicle goes beyond the vertical, for greater security. Then to prevent the automatic opposite action of the equilibrators of the left side, which are influenced by the regulator M because the higher raising of the right side brings the inclination of the left side, the regulator M is disconnected from the source of the electric current by the opening of the switch due to the action of the little electromagnet 38 energized by the passage of the electric current established by the contact of the body 35 with the electrode 37', which has brought in action the equilibrators of the right side. Thus the mechanism of the left side remains inoperative.

The sensibility of the regulator N is regulated by regulating the length of its spring.

In general there is a central pressure accumulator Z, a regulator M, a regulator N, two electromagnets 31, the one for the wheels of the right side and the other for those of the left side; a pair of cocks for each side and four equilibrators 7 one for each wheel.

Figure 8:
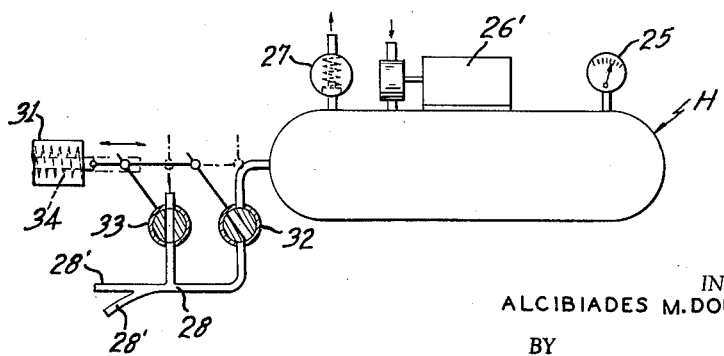
FIG. 8 is a view similar to that of FIG. 7 showing a part of the mechanism of the equilibrator device of FIG. 7, applied to a compressed air system.

FIG. 8 shows a central pressure accumulator device like that of FIG. 7, but here the pressure accumulator H contains only compressed air, with which the equilibrators 7 are directly filled, without intervention of a liquid, which in the device of FIG. 7 acts as an uncompressible liquid lever. The pressure accumulator H is filled with compressed air by the compressor 26'. Here the depot 24 is lacking since the air is drawn by the compressor directly from the ambient atmosphere, to which it is sent back after use. As to the remainder, the working of the regulators M and N and the equilibrators 7, is the same as in FIG. 7.

Besides the above automatic working of the equilibrators, the device may work also by direct operation by the operator of the vehicle, who by opening certain cocks may raise the frame on one side, or on both sides so removing the whole frame from a ground presenting great irregularities.

FIG. 2 shows a cross section of the tubular second solid chamber B of the FIG. 1 and of the enclosed air chamber 13, which, as shown, has a flattened shape for easy and regular yielding of its lateral wall, which for the same purpose is thinner as shown at the point 13' in order to yield at first, carrying away progressively the contiguous parts of the walls as shown by the dotted lines 16, while the opening for the admission of the liquid to compress the above thinner wall is located facing to the this thinner wall.

FIG. 3 shows a first liquid filled chamber 17 the compressible wall of which consists of a piston 18 sliding in a cylinder comprising the chamber 17 filled with the liquid, while an equilibrator 7' is adapted to the cylinder, included in a separate space 10', which communicates suitably with the interior of the cylinder by some holes, this construction form being provided with a spring 9". The chamber 7' is connected by a conduit 8' into one of the systems shown in FIGS. 7 and 8. The cylinder 17 communicates through the conduit 5' with a second chamber like the chamber B of FIG. 1. The working of this device is analogous to that of the device A shown in FIG. 1.

FIG. 4 shows a device similar to that of FIG. 3, but which is not connected to a separate solid chamber B, instead a compressible air chamber 21 analogous to the air chamber contained in the chamber B, is inclosed into the void space of a hollow piston 19 in a perforated expansion-limiting chamber 20; thus when the device is compressed and the piston 19 slides into the cylinder 17', liquid flows from the cylinder 17' through a passage comprising a constricting valve K' like the valve K, and compresses the walls of the air filled chamber 21.

FIG. 6 shows an additional flow reducing device, traversed by a part of the liquid which departs from or returns to the compression chamber A, when this latter is pressed or relaxed, this part flowing parallel and independently of the liquid which traverses the restricting valve K. While this device permits free flow of liquid during the small oscillations of the frame, which take place in the normally middle zone of the vertical displacements of the frame, it restricts this flow on both sides of this zone, for up and down movements where the great oscillations take place, thus it increases the opposed resistance and limits the great oscillations of the frame and the abrupt bumps and jolts, thereby providing for the smooth jolt-free travel of the vehicle.

The above device is constructed and works as follows:

A conduit $a$, $a'$ is connected into the opposite sides of the restricting valve K and communicates at its ends with the conduit 5. To this conduit is adapted the cylinder C, the interior of which communicates with the conduit $a$, $a'$ through two holes $d$ and $d'$, facing each other. The cylinder is closed at one end. In the cylinder slides the bolt $e$, which is transversely traversed by the ovid opening $g$ through which as also through the two holes $d$ and $d'$ communicate the two parts of the conduit $a$, $a'$, these three openings facing each other. The open end of the cylinder C is continued by the conoidal part $m$, which is hermetically covered by the concentrically corregulated elastic thin steel plate $h$. An hermetically closed space $b$ is formed in this manner, communicating with the conduit $a$, $a'$ by the hole $n$. The bolt $e$ is fixed to the center of the plate $h$. The spring band $i$ is hooked to the edges of the conoidal part, which by the screw $j$ regulates the elastic resistance of the plate $h$, as also the correct placing of the ovid opening $g$. The closed space $b$ is full with the liquid contained in the conduit 5. The liquid in the space $b$ is always under the same pressure as that in the conduit 5 and in the compression chamber A, because of the communication hole $n$.

The plate $h$ of the device is so regulated, that during small oscillations and vibrations of the frame, the two holes $d$ and $d'$ of the cylinder and the opening $g$ of the bolt are normally in register, thus the liquid flows freely through them; as on the other hand the restriction caused by the valve K is not great at such moments, the vibrations and the small oscillations are easily and calmly absorbed and the course of the vehicle is consequently smooth and deprived of abrupt bumps and jolts.

But during great oscillations, when the frame goes down and the distance between it and the axis of the wheel is diminished, the compression chamber A is strongly compressed and the pressure of the liquid in the whole system and in the space $b$ is increased, thereby moving the plate $h$ outwardly carrying the bolt, so that the holes $d$, $d'$ are partly or completely closed, thereby restricting the flow therethrough, to which is added the flow restrictions effected by the valve K, whereby great oscillations are reduced. Alternately when the frame goes upwards and the distance between the frame and the axle is increased, the pressure of the liquid in the whole system is diminishing, the plate $h$ pressed by the spring $i$ is pushed towards the cylinder C and pushes in its turn the bolt $e$ towards the bottom of the cylinder, the holes $d$, $d'$ are partly or even completely closed, the flow through them is restricted and, finally, the great oscillations are reduced resulting in that bumps and jolts are prevented thereby the course of the vehicle is smooth.

It is understood that the whole flow of liquid which comes from or returns to the first compressed chamber A, may traverse the flow reducing device shown in FIG. 6, in which case the restricting valve K may be omitted.

It is understood that many alternatives may exist concerning the forms, dimensions, materials and details of the devices the principles remaining the same. Where air or gas is mentioned an inert gas may be preferably used as for example nitrogen, helium, argon, xenon, etc.

This application is a continuation-in-part of application Serial No. 401,334, filed December 30, 1953, and now abandoned.

What I claim is:

1. A hydropneumatic elastic system applicable to shock absorbers, suspension devices and the like for vehicles, comprising a first liquid-filled chamber having a yieldable wall subject to external pressure mounted between the axle and frame of the vehicle with the yieldable wall supporting the weight applied thereto by the frame of the vehicle, a second liquid-filled chamber having solid indeformable walls, a liquid-flow conduit connecting the interiors of said chambers, a gas-filled chamber within the solid indeformable second chamber surrounded by the liquid therein and having flexible walls yieldable inwardly in response to external pressure, said gas-filled chamber being incapable of dilation beyond a predetermined limit, the system being such that when external pressure is applied to said yieldable wall of the first chamber, liquid escapes through the said conduit into the second chamber and compresses the gas in the gas-filled chamber thereby decreasing the volume of the gas-filled chamber, liquid being caused to flow in the reverse direction by the elastic reaction of the compressed gas in the gas-filled chamber when the external pressure on the yieldable wall is relaxed, said system being characterized by including a flow restricting valve interposed in the said conduit, said valve permitting free flow of the liquid from the first chamber into the second chamber, but retarding the flow of liquid in the reverse direction, a flow reducing device connected into said conduit in parallel with the said restricting valve, said flow reducing device being traversed by a part of the liquid which flows from and returns to the first compressible chamber when the latter is respectively compressed and relaxed, said part of the liquid flowing parallel and independently of the liquid traversing said restricting valve, said flow reducing device permitting said partial flow during the vibrations and the small oscillations of the frame but restricting this flow in response to great oscillations, thereby limiting said great oscillations, thus preventing the abrupt bumps and jolts to which the vehicle is subjected and providing smooth riding, an equilibrator including means for increasing and decreasing the pressure in the first chamber, means responsive to the abrupt lateral tilting of the vehicle frame for righting the frame of the vehicle, and a spirally wound spring mounted in the fluid-filled chamber for opposing the external pressure applied to the liquid-filled chamber, said spring being mounted in parallel with the elastic resistance opposed by the compressed fluid, thereby reducing the pressure exerted on the yieldable wall of the chamber while said parallel mounting excludes any danger of resonance.

2. A hydropneumatic elastic system applicable to shock absorbers, suspension devices and the like for vehicles, comprising a first liquid-filled chamber having a yieldable wall subject to external pressure mounted between the axle and frame of the vehicle with the yieldable wall supporting the weight applied thereto by the frame of the vehicle, a second liquid-filled chamber having solid indeformable walls, a liquid-flow conduit connecting the interiors of said chambers, a gas-filled chamber within the solid indeformable second chamber surrounded by the liquid therein and having flexible walls yieldable inwardly in response to external pressure, said gas-filled chamber being incapable of dilation beyond a predetermined limit, the system being such that when external pressure is applied to said yieldable wall of the first chamber, liquid escapes through the said conduit into the second chamber and compresses the gas in the gas-filled chamber thereby decreasing the volume of the gas-filled chamber, liquid being caused to flow in the reverse direction by the elastic reaction of the compressed gas in the gas-filled chamber when the external pressure on the yieldable wall is relaxed, said system being characterized in that the conduit connecting the first and second chambers of the casing comprises a conoidal conduit inclined toward the first chamber, a metallic unalterable ball of a suitable weight and diameter located in said conoidal conduit and movable freely therein, the smaller end of the conoidal conduit being located toward the first chamber, and means for retaining the ball at a predetermined distance from the respective ends of the conoidal conduit in order to prevent their closure, so that when liquid flows from the first chamber to the second chamber the ball is forced by the liquid to the larger end of the conduit, the construction being such that when liquid flows from the second chamber to the first chamber the ball is forced toward the narrower end of the conoidal conduit by the action of the current of liquid flowing therethrough, whereby a restricted flow of liquid is obtained when the liquid flows from the second chamber to the first chamber, a flow reducing device connected into said conduit in parallel with said conoidal conduit, said flow reducing device being traversed by a part of the liquid which flows from and returns to the first compressible chamber when the latter is respectively compressed and relaxed, said part of the liquid flowing parallel and independently of the liquid traversing said conoidal conduit, said flow reducing device permitting said partial flow during the vibrations and the small oscillations of the frame but resrticting this flow in response to great oscillations, thereby limiting said great oscillations, thus preventing the abrupt bumps and jolts to which the vehicle is subjected and providing smooth riding, an equilibrator including means for increasing and decreasing the pressure in the first chamber, and means responsive to the abrupt lateral tilting of the vehicle frame for righting the frame of the vehicle.

3. A hydropneumatic elastic system for resiliently supporting a chassis or vehicle frame on the axle of a vehicle, comprising a first liquid-filled chamber having a yieldable wall subject to external pressure, a second liquid-filled chamber having solid indeformable walls, a liquid flow conduit connecting the interiors of said chambers, the first chamber being mounted between the chassis and the axle of the vehicle with the yieldable wall supporting the weight applied thereto by the chassis or frame, a gas chamber filled with compressed gas within the second chamber, said gas chamber having flexible walls easily yieldable inwardly in response to external pressure, means for preventing dilation of the gas chamber beyond a predetermined limit, the liquid in said second chamber surrounding the yieldable walls of the said gas chamber, the liquid in both chambers being subject to the weight applied thereto by the chassis which in turn applies a corresponding compressive force on the gas in the gas chamber from all points around the external surface of its flexible walls, said system being characterized in that the conduit connecting the first and second chambers includes a conoidal conduit section inclined toward the first chamber, a metallic unalterable ball of a suitable weight and diameter located in said conoidal conduit section and movable freely therein, the smaller end of the conoidal conduit section being located toward the first chamber, and means for retaining the ball a predetermined distance from the respective ends of the conoidal conduit section in order to prevent their closure so that when liquid flows from the first chamber to the second chamber the ball is forced by the liquid to the larger end of the conduit section, the construction being such that when liquid flows from the second chamber to the first chamber the ball is forced toward the narrower end of the conoidal conduit section by the action of the current of liquid flowing therethrough, whereby a restricted flow of liquid is obtained when the liquid flows from the second chamber to the first chamber.

4. In a hydropneumatic elastic system applicable to shock absorbers, suspension devices and the like for vehicles, including a first liquid-filled chamber having a yieldable wall subject to external pressure and mounted between the axle and frame of the vehicle with the yieldable wall supporting the weight applied thereto by the frame of the vehicle, a second liquid-filled chamber having solid indeformable walls, a liquid-flow conduit connecting the interiors of said chambers, a gas-filled chamber within the solid indeformable second chamber surrounded by the liquid therein and having flexible inextensible walls yieldable inwardly in response to external pressure, said gas-filled chamber being incapable of dilation beyond a predetermined limit, the system being such that when external pressure is applied to said yieldable wall of the first chamber, liquid escapes through the said conduit into the second chamber and compresses the gas in the gas-filled chamber thereby decreasing the volume of the gas-filled chamber, liquid being caused to flow in the reverse direction by the elastic reaction of the compressed gas in the gas-filled chamber when the external pressure on the compressible deformable wall is relaxed, the improvement in which the system includes a flow restricting valve interposed in the said conduit, said valve permitting free flow of the liquid from the first chamber into the second chamber but retarding the flow of liquid in the reverse direction, a flow-reducing device connected into said conduit in parallel with the said restricting valve, said flow-reducing device being traversed by a part of the liquid which flows from and returns to the first compressible chamber when the latter is respectively compressed and relaxed, said part of the liquid flowing parallel and independently of the liquid traversing said restricting valve, said flow-reducing device including a valve member responsive to the pressure of the liquid in said conduit to permit said partial flow during the vibrations and the small oscillations of the frame but restricting this flow when the pressure in the conduit increases in response to road conditions tending to produce great oscillations, and a spring acting on said valve member to restrict the flow through the flow-reducing device when the pressure in the conduit is reduced in response to road conditions tending to produce great oscillations, thereby limiting said great oscillations and preventing the abrupt bumps and jolts to which the vehicle is subjected and providing smooth riding.

5. A hydropneumatic elastic system as claimed in claim 3, including an equilibrator means for increasing and decreasing the pressure in the first liquid-filled chamber, means responsive to the abrupt lateral tilting of the vehicle frame for actuating said means for increasing and decreasing the pressure in the first chamber, whereby the vehicle frame is tilted in a direction opposite to the abrupt lateral tilting of the vehicle.

6. In a hydropneumatic elastic system as claimed in claim 5, in which the means for increasing and decreasing the pressure in the first liquid-filled chamber includes an expansible and contractible chamber located inside the liquid-filled chamber, and means actuated by the said responsive means for admitting fluid under pressure to said expansible and contractible chamber and for releasing the fluid therefrom.

References Cited in the file of this patent

UNITED STATES PATENTS

| | | |
|---|---|---|
| 1,169,625 | Dryer | Jan. 25, 1916 |
| 1,414,623 | Church | May 2, 1922 |
| 1,785,339 | Daland | Dec. 16, 1930 |
| 2,115,158 | Dupuy et al. | Apr. 26, 1939 |
| 2,165,465 | Ehrhardt et al. | July 11, 1939 |
| 2,257,913 | Maranville | Oct. 7, 1941 |
| 2,260,606 | Clark | Oct. 28, 1941 |
| 2,620,182 | Marston | Dec. 2, 1952 |
| 2,644,699 | Weiertz | July 7, 1953 |